US012170422B2

(12) United States Patent
Liao

(10) Patent No.: US 12,170,422 B2
(45) Date of Patent: Dec. 17, 2024

(54) PLUG CONNECTOR WITH PROTECTIVE STRUCTURE

(71) Applicant: BELLWETHER ELECTRONIC CORP., Taoyuan (TW)

(72) Inventor: Yen-Jang Liao, Taoyuan (TW)

(73) Assignee: BELLWETHER ELECTRONIC CORP., Taoyuan (TW)

( * ) Notice: Subject to any disclaimer, the term of this patent is extended or adjusted under 35 U.S.C. 154(b) by 360 days.

(21) Appl. No.: 17/714,098

(22) Filed: Apr. 5, 2022

(65) Prior Publication Data

US 2023/0238739 A1 Jul. 27, 2023

(30) Foreign Application Priority Data

Jan. 25, 2022 (TW) ................................ 111201010

(51) Int. Cl.
*H01R 13/648* (2006.01)
*H01R 13/627* (2006.01)
*H01R 13/631* (2006.01)

(52) U.S. Cl.
CPC ....... *H01R 13/6272* (2013.01); *H01R 13/631* (2013.01)

(58) Field of Classification Search
CPC .......................... H01R 13/6272; H01R 13/631
USPC .......................................................... 439/108
See application file for complete search history.

(56) References Cited

U.S. PATENT DOCUMENTS 6,010,354 A * 1/2000 Cunningham ..... H01R 13/6272 439/417
7,303,438 B2 * 12/2007 Dawiedczyk ...... H01R 12/7023 439/607.53
9,590,353 B2 * 3/2017 Regnier ............. H01R 13/6582
9,893,464 B2 * 2/2018 Endo .................... H01R 13/639
10,164,375 B1 * 12/2018 Xie ....................... H01R 13/506
10,756,468 B2 * 8/2020 Liao ................... H01R 13/6473
10,855,028 B1 * 12/2020 Henry ................ H01R 13/6272
10,910,747 B1 * 2/2021 He ......................... H01R 12/75
11,018,449 B2 * 5/2021 Ito ........................ H01R 12/714
2012/0094515 A1 * 4/2012 Wu .................... H01R 13/6272 439/159
2022/0200200 A1 * 6/2022 Ito ...................... H01R 13/6272
2022/0224042 A1 * 7/2022 Zier ..................... H01R 13/502

FOREIGN PATENT DOCUMENTS

TW M584035 U 9/2019
TW M591719 U 3/2020
TW M593669 U 4/2020
TW M597517 U 6/2020
TW M597991 U 7/2020

* cited by examiner

*Primary Examiner* — Abdullah A Riyami
*Assistant Examiner* — Vladimir Imas
(74) *Attorney, Agent, or Firm* — MUNCY, GEISSLER, OLDS & LOWE, P.C.

(57) ABSTRACT

The present invention discloses a plug connector including an elastic fastener and a protective shield. The protective shield provides protection for the elastic fastener by covering or blocking the latter. In a typical example, the protective shield includes a main plate. The protective shield spans over a pressing piece of the elastic fastener and is overlapped with at least one portion of the pressing piece so as to cover and protect the latter.

20 Claims, 11 Drawing Sheets

PLUG CONNECTOR WITH PROTECTIVE STRUCTURE

BACKGROUND OF THE INVENTION

1. Field of the Invention

The present invention relates to an electrical connector, and more particularly to an electrical connector equipped with a protective structure.

2. Description of the Related Art

Electrical connector assemblies have been widely used in various fields. A variety of electrical connector components of different specifications can be found in a computer host. No matter what kind of electrical connector assembly it is, a set of electrical connector assembly usually includes a socket connector and a plug connector which can be inserted into the socket connector correspondingly. For example, the three conventional electrical connector assemblies shown in FIGS. 13-15 all include a socket connector 8 attached to a circuit board 80, and a plug connector 9 connected to one end of one or more bus cables 95.

The socket connector 8 has a socket body 81 and a metallic housing 82 surrounding the socket body 81. The socket body 81 has one or more slots 811 and a plurality of conductive terminals 812 spaced side by side in the slots 811 (only shown in FIG. 13). The metallic housing 82 is mounted on the circuit board 80, and the conductive terminals 812 are electrically connected to the circuit (not shown) on the circuit board 80. The plug connector 9 has an insulative body 91 and one or more plug boards 92 disposed on the insulative body 91. On the plug board 92 are a plurality of conductive pads 921 (commonly referred to as gold fingers), and these conductive pads 921 are electrically connected to a plurality of wires (not shown) in the bus cables 95. When the plug connector 9 is plugged into the socket connector 8 by a user, the insulative body 91 of the plug connector 9 is partially inserted into the metallic housing 82 of the socket connector 8, and the plug boards 92 of the plug connector 9 are inserted into the slots 811 of the socket body 81 of the socket connector 8, and the conductive pads 921 on the plug boards 92 are in one-to-one contact with the conductive terminals 812 in the slots 811, so that the circuit on the circuit board 80 is electrically connected to the wires within the bus cable 95 for transmission of signals and/or power. This type of socket connectors 8 and plug connectors 9 is illustrated in more detail in Taiwan Patents Nos. M593669, M584035, M591719, M597517 and M597991, and will not be described further.

It should be noted that, in order to prevent the plug connector 9 from being arbitrarily separated from the socket connector 8, two engaging holes 84 are defined in the metallic housing 82 of the socket connector 8, and an elastic fastener 93 with two engaging portions 930 is correspondingly arranged on the insulative body 91 of the plug connector 9. Once the plug connector 9 is plugged into the socket connector 8, the two engaging portions 930 of the elastic fastener 93 are fastened into the two engaging holes 84 in the metallic housing 82, so as to ensure that the plug connector 9 will not be arbitrarily separated from the socket connector 8.

However, the problem is that, no matter which conventional plug connector 9 is used, the elastic fastener 93 is exposed and completely unprotected. Especially, the front side of the elastic fastener 93 is not shielded or blocked at all, which indicates that the conventional plug connector 9 fails to provide a comprehensive protection for its elastic fastener 93 and needs to be improved.

Additionally, in order to ensure that the plug connector 9 is inserted into the socket connector 8 straight without bias, each of the conventional plug connectors 9 is further provided with a guiding structure 94 on both sides 910 of its insulative body 91.

Even though the guiding structures 94 of the conventional plug connectors 9 mentioned above are different in shape. Nonetheless, no matter which plug connector 9 it is, its two guiding structures 94 are independently attached to the two sides 910 of its insulative body 91, which makes the two guiding structures 94 isolated from each other and poor in structural strength. This problem also needs to be solved.

SUMMARY OF THE INVENTION

It is the object of the present invention to provide a plug connector with a protective shield to solve the aforementioned problem. Specifically, the plug connector of the present invention includes an insulative body, a plug board, an elastic fastener, and a protective shield. The plug board protrudes forward from the insulative body and has a plurality of conductive pads spaced next to each other. The elastic fastener is disposed on the insulative body and includes a pressing piece, the pressing piece has a free end spaced a distance from the insulative body. The protective shield is joined to the insulative body, disposed at a front side of the pressing piece of the elastic fastener, and spanning over at least one portion of the pressing piece, so that the protective shield is overlapped with at least one portion of the pressing piece in the vertical direction, and is spaced from the insulative body by a first receptacle. Thus, the protective shield covers at least one portion of the pressing piece to form protection.

In a preferred embodiment, the plug connector of the present invention includes two guiding structures located at both sides of the insulative body, the protective shield is disposed between the two guiding structures.

In another preferred embodiment, the two guiding structures and the protective shield of the plug connector are joined together, and the protective shield is higher than the two guiding structures, so that there is a height difference between the protective shield and each of the guiding structure.

In a preferred embodiment, the plug connector further includes the two guiding structures located at both sides of the insulative body, each of the guiding structure has a top plate and a side plate, the two top plates of the guiding structures are located at both sides of the protective shield and respectively joined to opposite ends of the protective shield. Wherein, the two side plates of the guiding structures are respectively joined to the opposite side edges of the insulative body, and spaced from the insulative body by a second receptacle. The two top plates are spaced from the insulative body by a third receptacle respectively, the two third receptacles are in communication with the first receptacle, and the two third receptacles are in communication with the two second receptacles respectively.

In a preferred embodiment, the first receptacle of the plug connector is a through receptacle.

In a preferred embodiment, the protective shield of the plug connector further comprises a cutout or a window for exposing one or more engaging portions of the pressing piece.

In another preferred embodiment, the protective shield of the plug connector is higher than the two top plates of the two guiding structures so that a height difference is defined between the protective shield and each of the top plates.

In yet another preferred embodiment, the protective shield of the plug connector has at least two supporting portions disposed at both sides of the elastic fastener and joined to the insulative body.

In one preferred embodiment, the protective shield of the plug connector has at least one portion overlapped with the at least one plug board in the vertical direction.

In another preferred embodiment, the elastic fastener of the plug connector further includes a fixed plate mounted on the insulative body, the pressing piece has a fixed end joined to the fixed plate, and the pressing piece is folded backward from the fixed plate, inclined upward and extending backward.

In another aspect, the present invention provides another type of plug connector comprises the aforementioned insulative body and plug board, and includes a pressing piece and a protective shield. The pressing piece has a fixed end and a free end, the fixed end is mounted on the insulative body, and the free end spaced a distance from the fixed end in a horizontal direction and also spaced a distance from the insulative body in a vertical direction. The protective shield, joined to the insulative body, and located a front side of the pressing piece, wherein the protective shield has a height greater than that of the fixed end of the pressing piece. Thus, the protective shield covers the pressing piece to form protection.

In one preferred embodiment, the insulative body of the plug connector further includes a protrusion, the protrusion is located between at least one plug board and the protective shield.

In yet another preferred embodiment, the fixed end of the pressing piece of the other type of plug connector is mounted on the protrusion.

In a preferred embodiment, the protective shield of the other type of plug connector includes a main plate and two protective side plates, the main plate is located outside an upper side of the insulative body, and the two protective side plates are respectively located outside both sides of the insulative body.

In one preferred embodiment, the insulative body of the other plug connector further includes two locking members respectively joined in between the two protective side plates of the protective shield and the insulative body.

In yet another preferred embodiment, the main plate and the insulative body of the other plug connector is spaced by a first receptacle, and the two protective side plates of the protective shield is spaced from the insulative body by a second receptacle, and the first receptacle and the two second receptacles are in communication with one another.

In another preferred embodiment, the protective shield of the other plug connector further includes a cutout or a window so as to expose one or more engaging portions of the pressing piece.

In one preferred embodiment, the protective shield of the other plug connector spans over the pressing piece, and is overlapped with at least one portion of the pressing piece in the vertical direction.

In yet another preferred embodiment, the protective shield is spaced a distance from the pressing piece and has no contact with the pressing piece.

In a preferred embodiment, the protective shield has at least two supporting portion respectively located at both sides of the pressing piece and joined to the insulative body.

The protective shield of the plug connector of the present invention offers a comprehensive protection for the elastic fastener. The protective structure provides protection for the elastic fastener by covering or blocking the same, which solves the problem that the conventional plug connector has poor protection for its elastic fastener.

Additionally, in one or more preferred embodiments, the protective shield is joined together with two guiding structures. As such, the protective structure not only has the functions of protection and guide, but also may integrate the two guiding structures into one piece, solving the problem that the guiding structures of the conventional plug connector is weak in structure due to the isolated guiding structures.

DETAILED DESCRIPTION OF EMBODIMENTS

Figure 1:
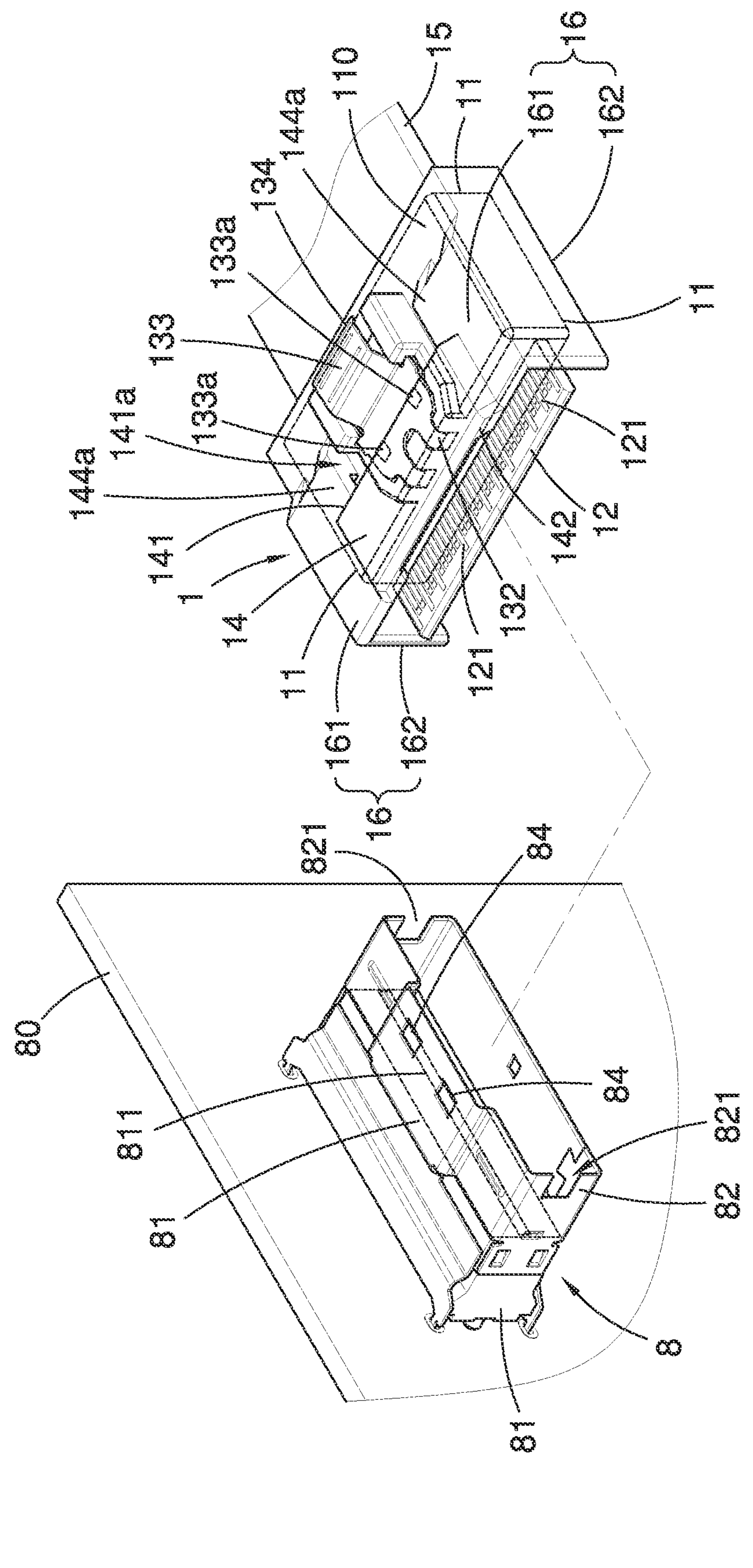
FIG. 1 is a perspective view of a plug connector in accordance with a first embodiment of the present invention.
Figure 2:
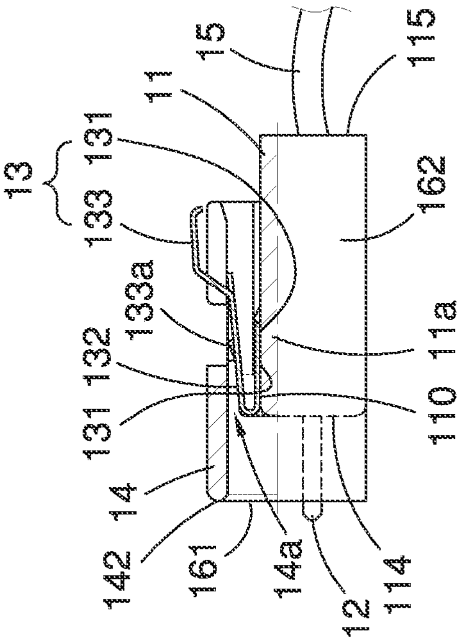
FIG. 2 is a partial cross-sectional view of the plug connector in accordance with the first embodiment of the present invention.

Referring to FIGS. 1 and 2, there is shown a first embodiment of a plug connector 1 which includes an insulative body 11, a plug board 12, an elastic fastener 13, and a protective shield 14. The plug board 12 protrudes forward from the insulative body 11 and has a plurality of conductive pads 121 spaced next to each other. The elastic fastener 13 is disposed on the insulative body 11 and includes a pressing piece 133. The pressing piece 133 has a free end 134 spaced a distance from the insulative body 11 in a vertical direction, and the free end 134 can be pressed by force for a downward elastic movement. The protective shield 14 is joined to the insulative body 11, disposed at a front side of the pressing piece 133 of the elastic fastener 13, and spanning over at least one portion of the pressing piece 133, so that the protective shield 14 is overlapped with the at least one portion of the pressing piece 133 in the vertical direction, and is spaced from the insulative body 11 by a first receptacle **14*a* (see FIG. 4**).

Since the protective shield 14 is overlapped with the at least one portion of the pressing piece 133 in the vertical direction—that is to say, the protective shield 14 is located over the at least one portion of the pressing piece 133, the protective shield 14 can at least cover and protect the at least one portion of the pressing piece 133. In other words, in the plug connector 1 according to this invention, the elastic fastener 13 is protected to some extent or better by the protective shield 14, and is thus safe and secure. This solves the problem that poor protection has been applied to the elastic fastener 93 of any of the convention plug connectors 9.

Preferably, the pressing piece 133 further has a fixed end 132 disposed on the insulative body 11 and spaced a distance from the free end 134 in a horizontal direction. The protective shield 14 can at least provide protection for the at least one portion of the pressing piece 133, which may be the fixed end 132 and its adjacent parts. However, in other examples, the at least one portion of the pressing piece 133 may be other parts of the pressing piece 133 so that the protective shield 14 can provide protection for the other parts.

Figure 3:
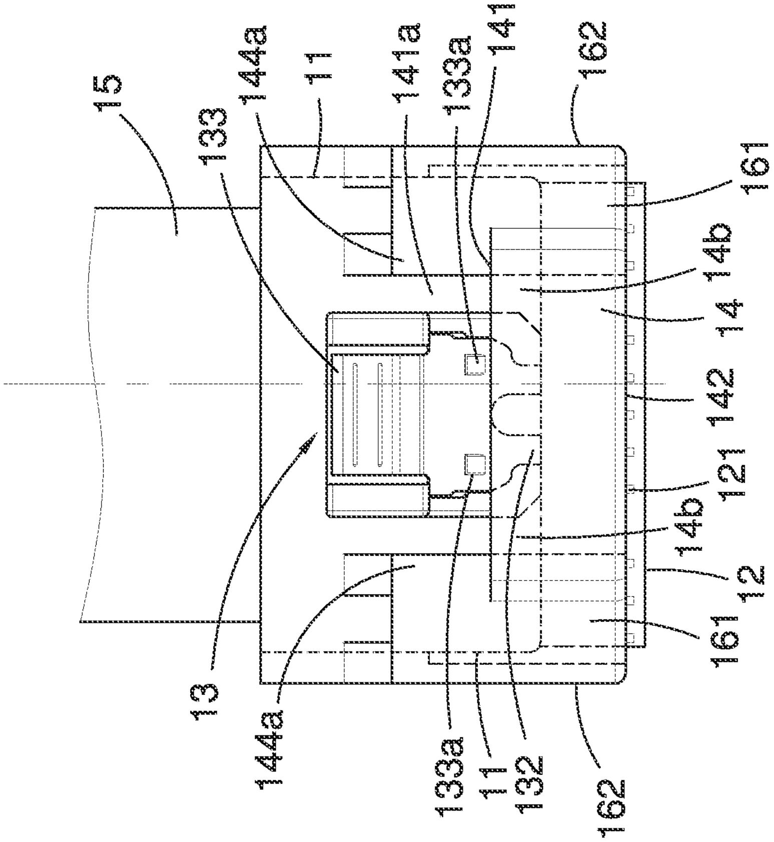
FIG. 3 is a top view of the plug connector in accordance with the first embodiment of the present invention.
Figure 4:
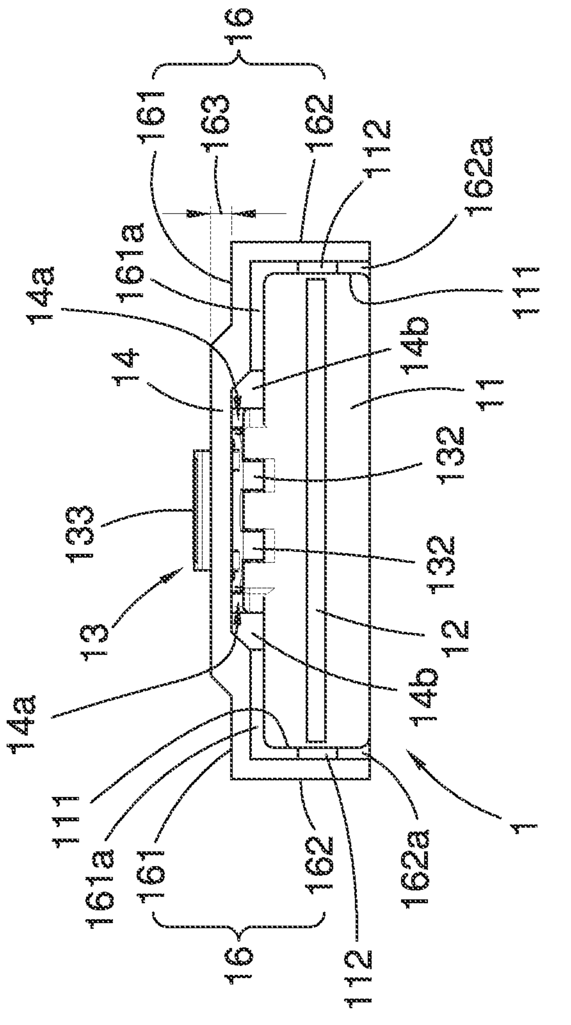
FIG. 4 is a front view of the plug connector in accordance with the first embodiment of the present invention.

In the first embodiment, as shown in FIG. 2, the fixed end 132 of the pressing piece 133 is secured to a top surface 110 of the insulative body 11 and is adjacent to a front end surface 114 of the insulative body 11. And, a distance between the fixed end 132 of the pressing piece 133 and the front end surface 114 of the insulative body 11 is smaller than a distance between the fixed end 132 of the pressing piece 133 and a rear end surface 115 of the insulative body 11. Additionally, as shown in FIGS. 1 to 3, the pressing piece 133 further includes one or more engaging portions **133*a* near the fixed end 132, and the protective shield 14 has a height greater than that of the fixed end 132 of the pressing piece 133. The free end 134 of the pressing piece 133 preferably has a height greater than that of the pressing piece 14. Referring again to FIG. 2, the insulative body 11 is neither joined to a rear side edge 141 nor to a front side edge 142 of the protective shield 14, which enables the first receptacle 14*a* to be located between the insulative body 11 and the protective shield 14 to become a through receptacle that communicates from front to back. As depicted in FIGS. 3 and 4, the first receptacle 14*a* has two passages 14*b* communicating from front to back and being respectively located at both sides of the pressing piece 133. Preferably, as shown in FIG. 1, the protective shield 14 is formed with a supporting portions 144*a* at each end thereof. The two supporting portions 144*a* of the protective shield 14 are located at both sides of the elastic fastener 13 and joined to the insulative body 11**.

In the first embodiment, as shown in FIGS. 1 and 2, the elastic fastener 13 preferably includes a fixed plate 131 secured on the insulative body 11. The fixed plate 131 is joined to the fixed end 132 of the pressing piece 133. Specifically, the pressing piece 133 is folded backward from the fixed plate 131, inclined upward and extending backward, so that the pressing piece 133 is tilted at an acute angle (greater than zero degree) with respect to the fixed plate 131 and becomes flexible. The pressing piece 133 has a length, in the horizontal direction, greater than that of the fixed plate 131. When no force is exerted on the free end 134 of the pressing piece 133, the protective shield 14 may contact with the pressing piece 133. Nonetheless, the protective shield 144 and the pressing piece 133 may be set apart with no contact.

In the first embodiment, as shown in FIGS. 1 and 3, the rear side edge 141 of the protective shield 14 faces towards the pressing piece 133 of the elastic fastener 13 and is located close to the engaging portions **133*a*. The protective shield 14 further defines a cutout 141*a* therein for exposing the engaging portions 133*a* of the pressing piece 133 therefrom. In short, as shown in FIGS. 2 and 3, the protective shield 14 is preferably employed for shielding the at least one portion of the pressing piece 133 of the elastic fastener 13, but not to shield the engaging portions 133*a* of the pressing piece 133**.

In the first embodiment, as shown in FIGS. 1 and 4, the plug connector 1 further includes two guiding structures 16 located at both sides of the insulative body 11. The two guiding structures 16 may be spaced a distance from the protective shield 14. Alternatively, as in the first embodiment, the two guiding structures 16 and the protective shield 14 are joined together. Preferably, each of the guiding structures 16 has a side plate 162 and a top plate 161. The two side plates 162 of the guiding structures 16 are respectively partly joined to the opposite side edges 111 of the insulative body 11, and spaced from the opposite side edges 111 of the insulative body 11 by two second receptacles **162*a*. The two top plates 161 of the guiding structures 16 are located at both sides of the protective shield 14 and respectively joined to opposite ends of the protective shield 14. The two top plates 161 are further joined to the top surface 110 of the insulative body 11, and spaced from the insulative body 11 by two third receptacles 161*a* respectively. The two third receptacles 161*a* may or may not communicate with the first receptacle 14*a* underneath the protective shield 14. The two third receptacles 161*a* may or may not communicate with the two second receptacles 162*a*. A width of the first receptacle 14*a* (i.e. the minimum distance between the protective shield 14 and the insulative body 11), a width of each of the two second receptacles 162*a* (i.e. a distance between one of the side plates 162 and the insulative body 11), a width of each of the two third receptacles 161*a* (i.e. a distance between one of the two top plates 161 and the insulative body 11**) are generally the same.

In the first embodiment, as shown in FIGS. 1 and 2, a bus cable 15 extending backward is attached to a rear end surface 115 of the insulative body 11. The conductive pads 121 on the plug board 12 are electrically connected to a plurality of wires (not shown) in the bus cable 15 in a one-to-one manner. When the plug connector 1 is plugged into the socket connector 8 as shown in FIG. 1 by a user, a front section **11*a* (see FIG. 2) of the insulative body 11 of the plug connector 1 can be inserted straight into the metallic housing 82 without bias, and the plug board 12 of the plug connector 1 can also be inserted straight into the slot 811 of the socket body 81 without bias, with the guidance of the two guiding structures 16. On the other hand, the metallic housing 82 is received in the first receptacle 14*a*, the two second receptacles 162*a*, and the two third receptacles 161*a* in a straight position. At this time, the conductive pads 121 on the plug board 12 are in contact with conductive terminals (not shown) within the slot 811 in such a one-to-one manner that the circuit on the circuit board 80 is electrically connected to the corresponding wires in the bus cable 15**, for signal and/or power transmission.

Because the protective shield 14 has two ends preferably joined to the two guiding structures 16 respectively, the two guiding structures 16 are not isolated, but are strengthened, which by itself solves the problem that the two guiding structures 94 of any of the conventional plug connectors 9 may be weak in structure.

In the first embodiment, as shown in FIGS. 1 and 4, the protective shield 14, the two top plates 161 and the two side plates 162 of the guiding structures 16 are integrally formed in one piece. In addition, the metallic housing 82 of the socket connector 8 has two cutouts 821, and the insulative body 11 of the plug connector 1 has two locking members 112. When the plug connector 1 is plugged into the socket connector 8 by the user, the two locking members 112 of the insulative body 11 are correspondingly introduced into the two cutouts 821 of the metallic housing 82 and engaged in the cutouts 821. In more detail, the two cutouts 821 are located at both sides of the metallic housing 82; and the two locking members 112 are located at the opposite side edges 111 of the insulative body 11 and connected in between the two side plates 162 and the insulative body 11.

In the first embodiment, as shown in FIG. 2, the plug board 12 has only a small portion projecting outside the front side edge 142 of the protective shield 14, and a large portion not projecting outside the front side edge 142. However, in other embodiments, the plug board 12 may be flush with the front side edge 142 of the protective shield 14 or completely not projecting outside the front side edge 142. In other words, the protective shield 14 is at least overlapped with the plug board 12 in the vertical direction. In addition, the protective shield 14 is preferably higher than the two top plates 161 of the guiding structures 16. In the first embodiment, the protective shield 14 and the two top plates 161 (or two guiding structures 16) has a height difference 163 (see FIG. 4).

Figure 5:
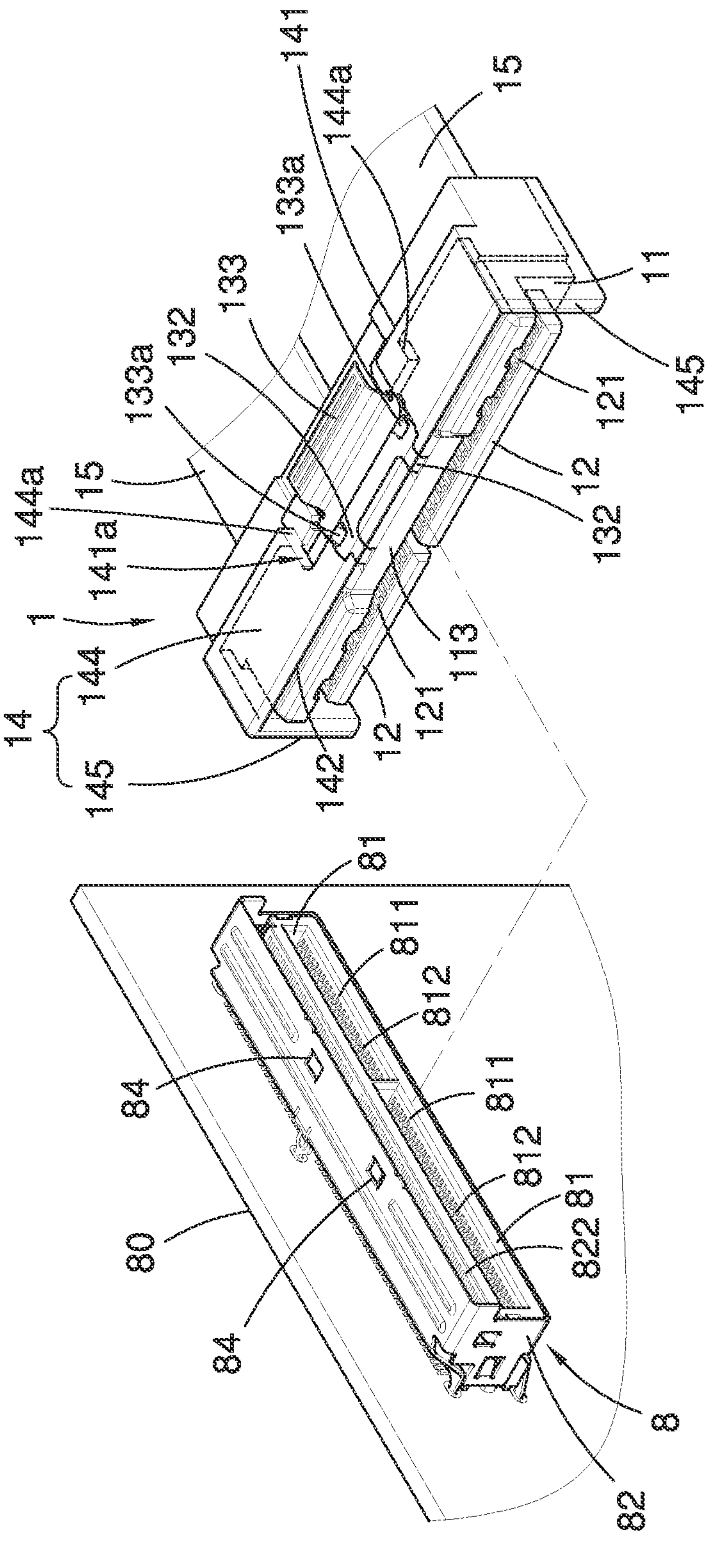
FIG. 5 is a perspective view of a plug connector in accordance with a second embodiment of the present invention.
Figure 7:
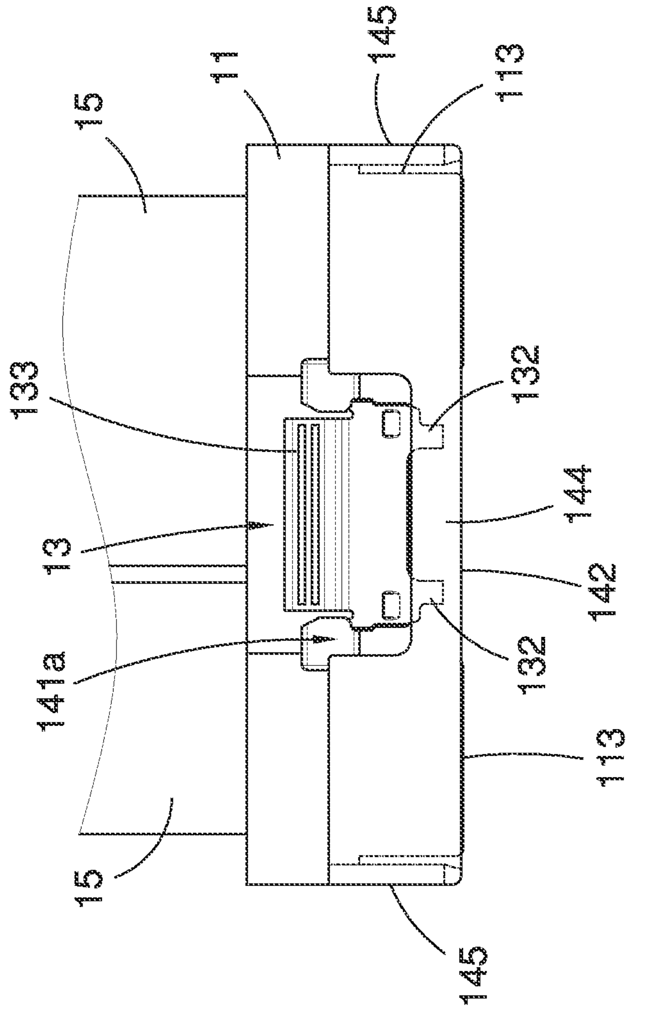
FIG. 7 is a top view of the plug connector in accordance with the second embodiment of the present invention.
Figure 8:
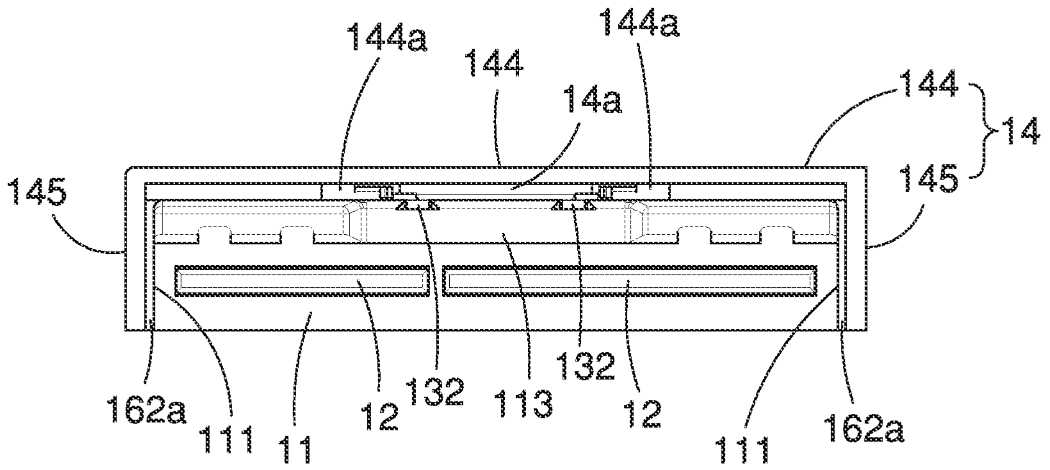
FIG. 8 is a front view of the plug connector in accordance with the second embodiment of the present invention.

Referring to FIGS. 5 to 8, there is shown a second embodiment of a plug connector 1. The second embodiment is generally the same as the first embodiment, except that the plug connector 1 of the second embodiment has two pieces of plug boards 12, and that the corresponding socket connector 8 has two socket bodies 81 with two slots 811 (inside which there are a plurality of conductive terminals 812) for insertion of the two plug boards 12 of the plug connector 1. Most importantly, the protective shield 14 has an inverted U-shaped cross-section, and includes a main plate 144 and a pair of protective side plates 145 joined all together. The main plate 144 and the two protective side plates 145 all are a flat plate. The main plate 144 is located outside the top side of the insulative plate 11, and is spaced from the insulative plate 11 by a first receptacle 14*a*. The first receptacle 14*a* is preferably a through receptacle in the horizontal direction. As shown in FIGS. 5 and 8, the protective shield 14 preferably includes at least a pair of supporting portions 144*a* joined to the main plate 144 as well as the insulative body 11. The two supporting portions 144*a* are preferably located at both sides of the pressing piece 133 of the elastic fastener 13. Also shown in FIG. 8, the two protective side plates 145 of the protective shield 14 are respectively located at the outside of the opposite side edges 111 of the insulative body 11, and each is spaced with the insulative body 11 by a second receptacle 162*a*. The first receptacle 14*a* and the two second receptacles 162*a* may or may not communicate with each other. In the second embodiment, the two protective side plates 145 function as the side plates 162 of the guiding structures 16 as described above. In practice, there may be a locking member formed in between each of the protective side plates 145 and the insulative body 11, similar to that in the first embodiment, for connection of the insulative body 11 and the corresponding protective side plates 145.

Figure 6:
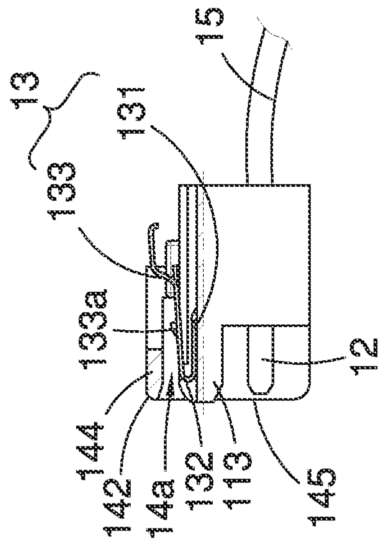
FIG. 6 is a partial cross-sectional view of the plug connector in accordance with the second embodiment of the present invention.

Additionally, as shown in FIGS. 5 and 6, in the second embodiment, the socket connector 8 has an alignment slot 822 defined in between the socket body 81 and the metallic housing 82; and the insulative body 11 of the plug connector 1 has a protrusion 113 extending forward and located over the plug board 12 and interposed between the plug board 12 and the main plate 144 of the protective shield 14. When the plug connector 1 is plugged into the socket connector 8 by the user, the protrusion 113 of the insulative body 11 is received in the alignment slot 822 of the socket connector 8 between the metallic housing 82 and the socket body 81. In more detail, the protrusion 113 of the insulative body 11 extends forward from a side of the insulative body 11 and is formed integrally with the insulative body 11. The elastic fastener 13 is disposed on the protrusion 113 of the insulative body 11. That is, the fixed end 132 of the pressing piece 133 is mounted on the protrusion 113. Additionally, the protrusion 113 of the insulative body 11 is spaced a distance (i.e. the first receptacle 14*a*) from the main plate 144 of the protective shield 14. And, the distance is generally the same as or wider than the width of any of the second receptacles 162*a*. Furthermore, in the second embodiment, as shown in FIG. 6, the plug board 12 does not stick outside the front side edge 142 of the protective shield 14.

Figure 9:
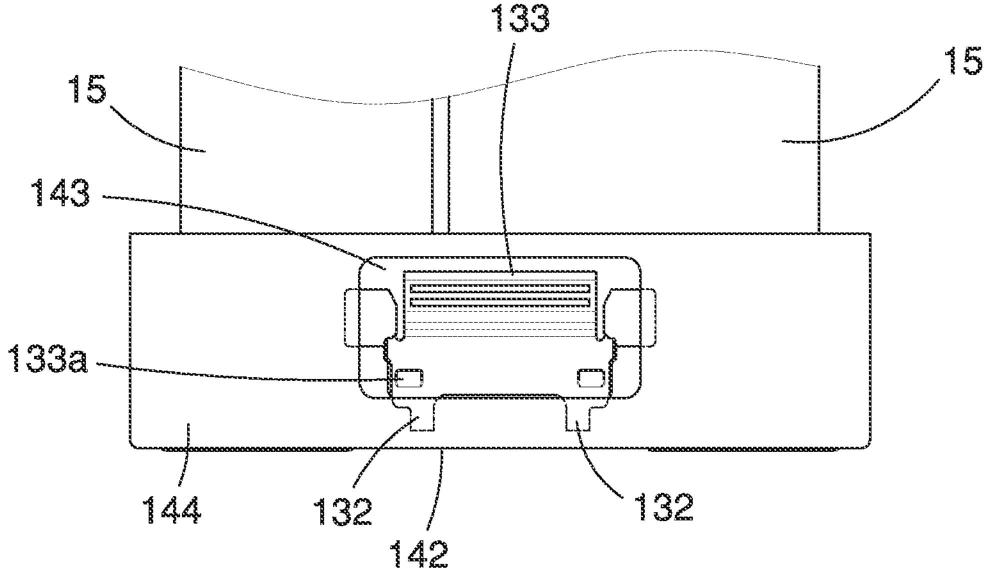
FIG. 9 is a top view of a plug connector in accordance with a third embodiment of the present invention.

Referring to FIG. 9, there is shown a third embodiment of a plug connector 1. The third embodiment is generally the same as the second embodiment, except that the protective shield 14 of the third embodiment further defines a window 143 therein to expose the respective engaging portions 133*a* of the elastic fastener 13 from the window 143. In other embodiments, the window 143 may be replaced with the cutout 141*a* for exposing the engaging portions 133*a*. This enables the user to easily check whether the engaging portions 133*a* of the plug connector 1 are correctly engaged in the engaging holes 84 of the socket connector 8.

Figure 10:
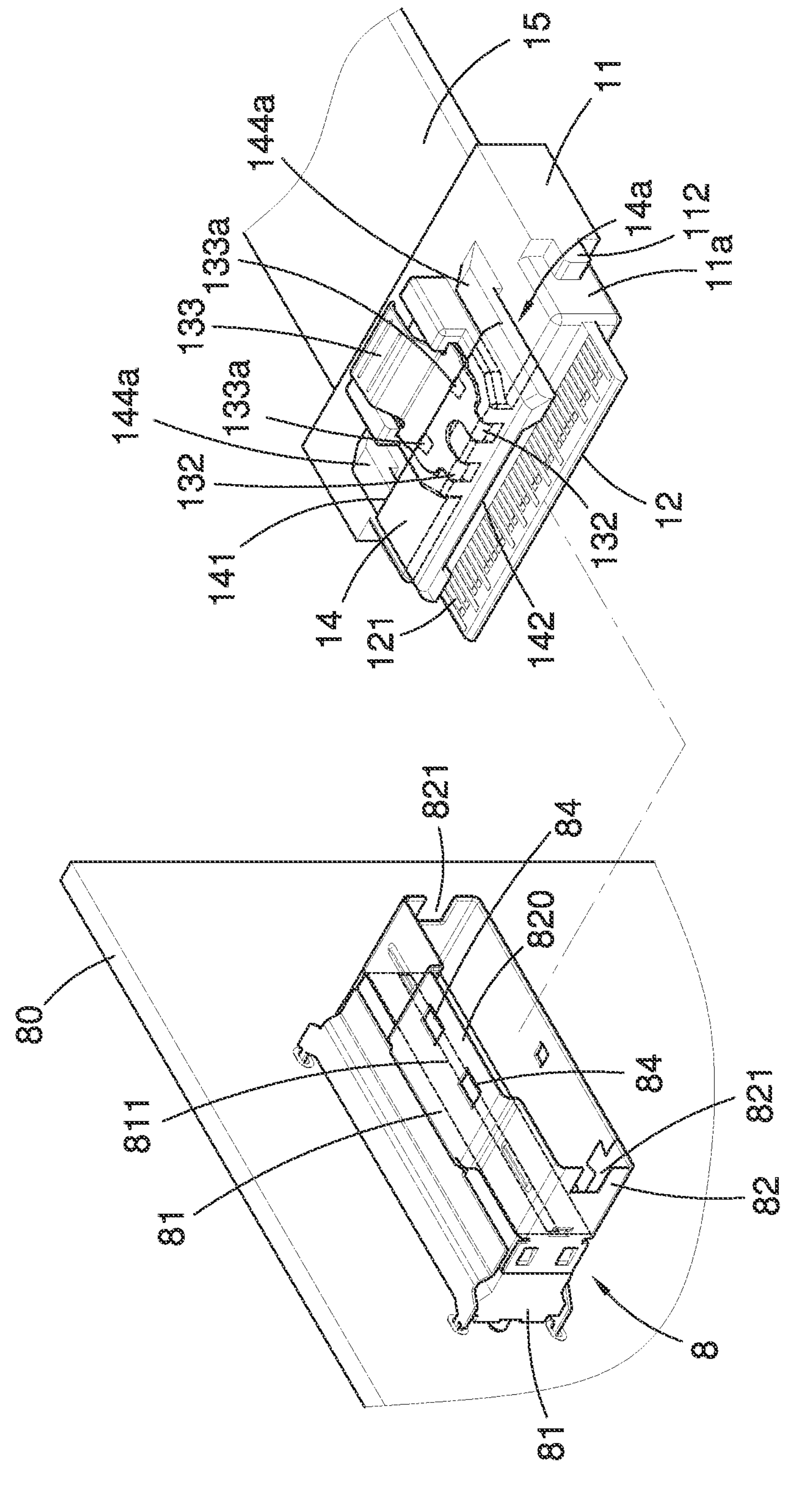
FIG. 10 is a perspective view of a plug connector in accordance with a fourth embodiment of the present invention.

Referring to FIG. 10, there is shown a fourth embodiment of a plug connector 1. The fourth embodiment is generally the same as the first embodiment, except that in the fourth embodiment, no guiding structures 16 are employed, and the protective shield 14 is located above the insulative body 11 and protrudes forward. Additionally, the protective shield 14 further includes two supporting portions 144*a* respectively located at both sides of the elastic fastener 13 and joined to the insulative body 11. When the plug connector 1 is plugged into the socket connector 8 by the user, the front section 11*a* of the insulative body 11 of the plug connector 1 is inserted into the metallic housing 82, and the plug board 12 of the plug connector 1 is received in the slot 811 of the socket body 81. On the other hand, a top plate 820 of the metallic housing 82 is contained in the first receptacle 14*a* underneath the protective shield 14. In short, as shown in the fourth embodiment, it is understood that the protective shield 14 of the plug connector 1 may be formed from a single plate body, and the aforementioned side plates 162 are not needed.

Figure 11:
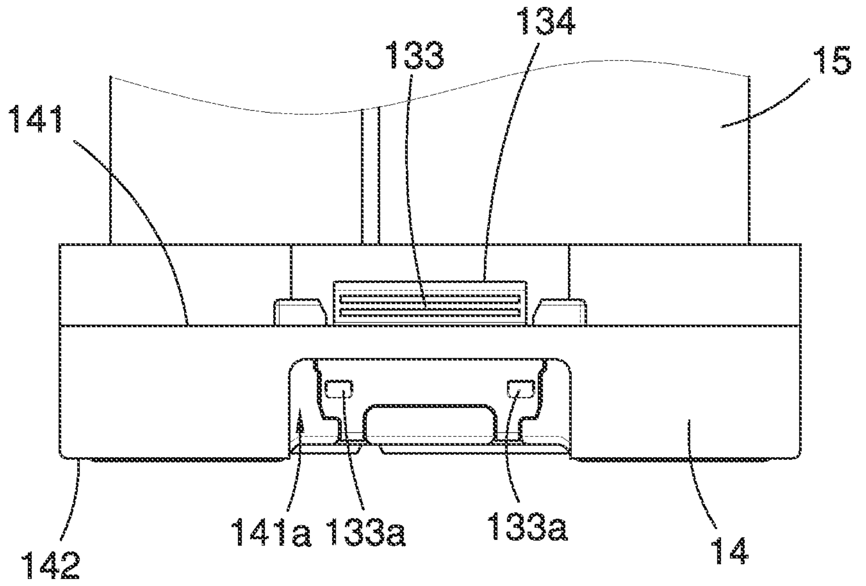
FIG. 11 is a top view of a plug connector in accordance with a fifth embodiment of the present invention.

Referring to FIG. 11, there is shown a fifth embodiment of a plug connector 1. As described above, the cutout 141*a* may be formed in the rear side edge 141 of the protective shield 14. However, as in the fifth embodiment, the cutout 141*a* may be formed in the front side edge 142 of the protective shield 14. Alternatively, the protective shield 14 may cover the engaging portions 133*a*, and simply expose the free end 134 of the pressing piece 133. In this manner, the width of the protective shield 14 from the front side edge 142 to the rear side edge 141 can become larger, and thus the protective shield 14 is strengthened in structure.

Figure 12:
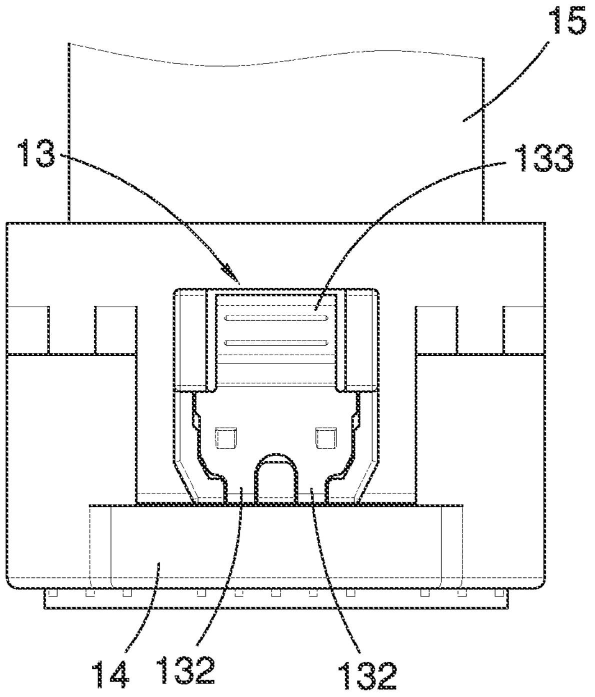
FIG. 12 is a top view of a plug connector in accordance with a sixth embodiment of the present invention.
Figure 13:
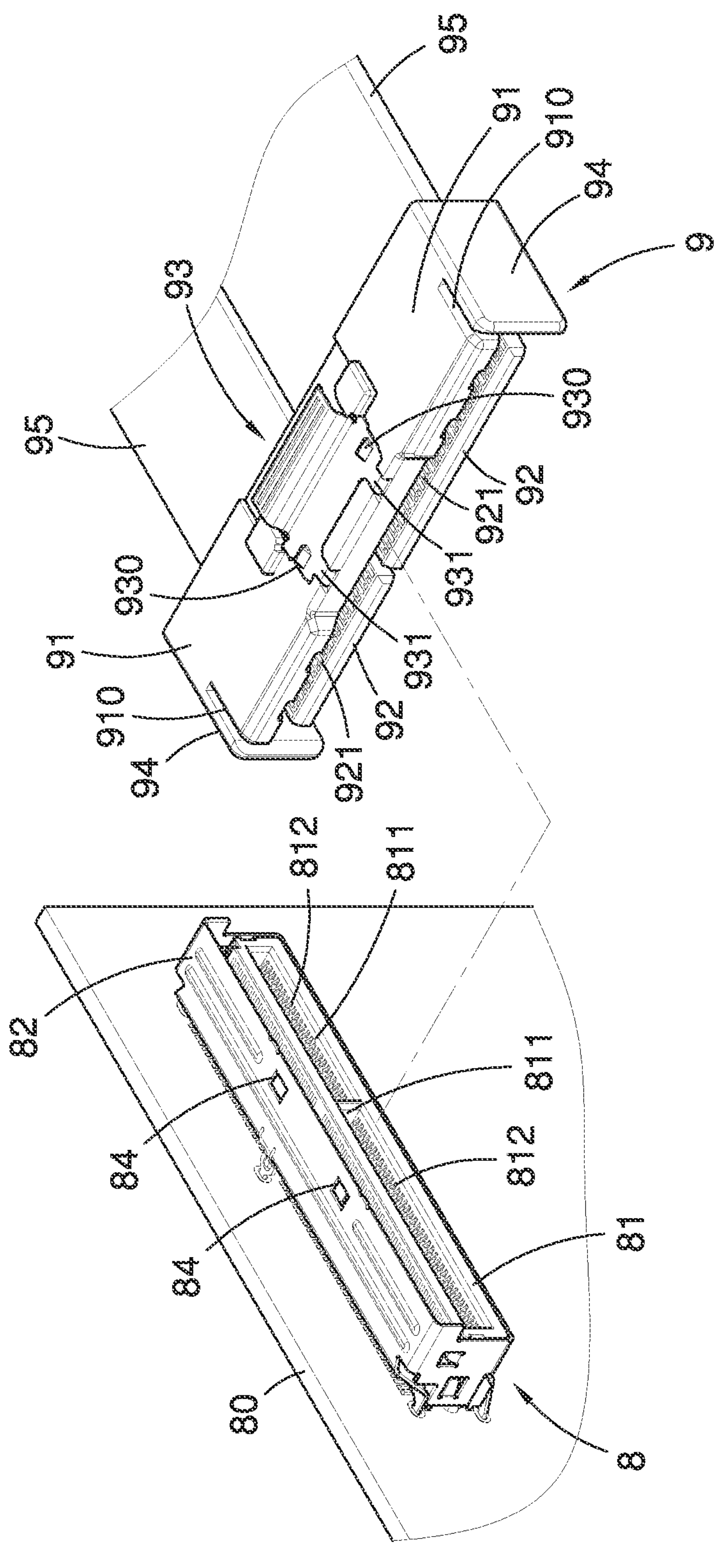
FIG. 13(PRIOR ART)
FIGS. 13 to 15 are perspective views of three conventional plug connectors respectively.
Figure 14:
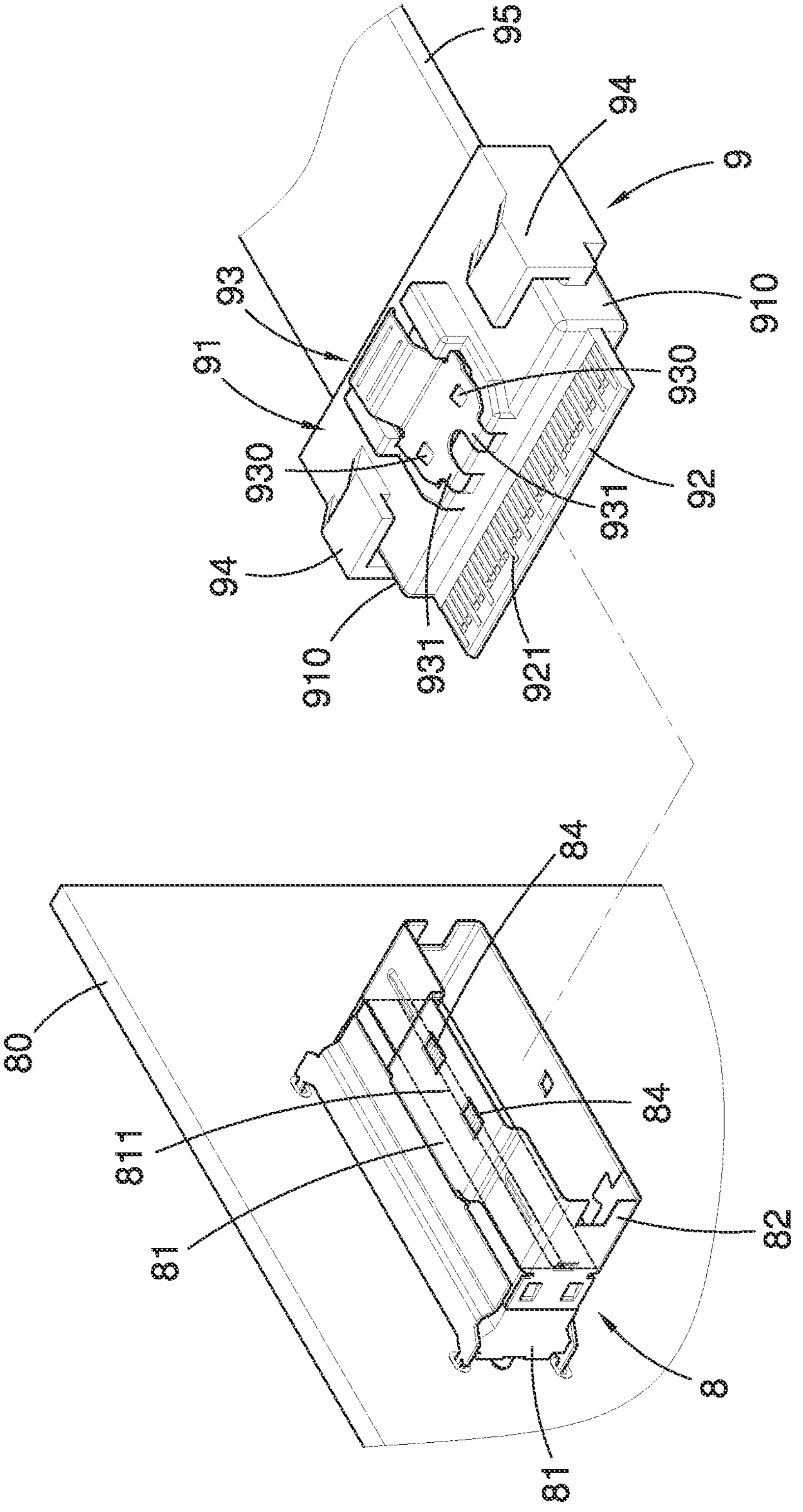
FIG. 14(PRIOR ART)
Figure 15:
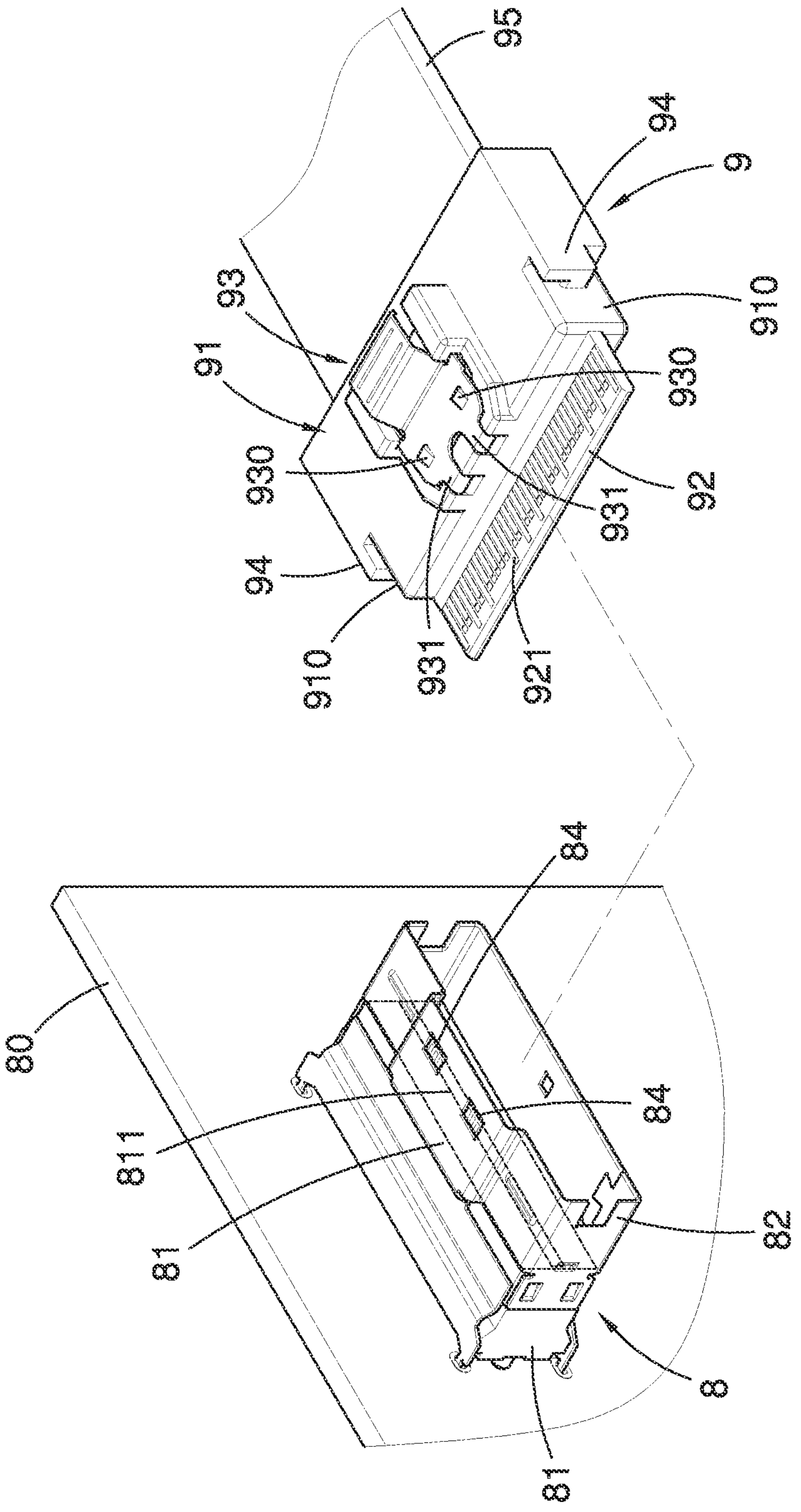
FIG. 15(PRIOR ART)

As in any of the first to fifth embodiments, the protective shield 14 covers at least one portion of the pressing piece 133 of the elastic fastener 13. However, as in a sixth embodiment shown in FIG. 12, it is possible to have the protective shield not cover the elastic fastener 13 at all. In this case, the protective shield 14 is located at a front side of the pressing piece 133 and has a height greater than that of the fixed ends 132 of the pressing piece 133. In this manner, the protective shield stands in front of the elastic fastener 13 to block and prevent the elastic fastener 13 from damage resulting from impact of an object, such as the aforementioned socket connector 8.

As describe above, the plug connector is equipped with an elastic fastener and a protective structure according to the present invention. The protective structure provides protection for the elastic fastener by covering or blocking the same, which solves the problem that the conventional plug connector has poor protection for its elastic fastener. Additionally, the protective structure may be a protective shield together with two guiding structures, or may be an inverted U-shaped protective shield with a guiding function. As such, the protective structure not only has the functions of protection and guide, but also may integrate the two guiding structures into one piece, solving the problem that the guiding structures of the conventional plug connector is weak in structure due to the isolated guiding structures. Nonetheless, the specific structure of the protective structure is not limited to the above. For example, the protective structure may provide a single protection function only.

What is claimed is:

1. A plug connector comprising:

an insulative body;

at least one plug board, protruding forward from the insulative body and having a plurality of conductive pads spaced next to each other;

an elastic fastener, disposed on the insulative body and including a pressing piece having a free end spaced a distance from the insulative body; and a protective shield, joined to the insulative body, located at a frond side of the pressing piece of the elastic fastener, and spanning over at least one portion of the pressing piece so as to be overlapped with the at least one portion of the pressing piece in a vertical direction and be spaced from the insulative body by a first receptacle that accommodates the at least one portion of the pressing piece.

2. The plug connector as recited in claim 1, further comprising two guiding structures respectively disposed at both sides of the insulative body, and the protective shield being disposed in between the two guiding structures.

3. The plug connector as recited in claim 2, wherein the protective shield is integrally formed with the two guiding structures, and is higher than the two guiding structures so that a height difference is defined between the protective shield and each of the guiding structures.

4. The plug connector as recited in claim 1, further comprising two guiding structures respectively disposed at both sides of the insulative body, each of the guiding structures having a top plate and a side plate, the two top plates being disposed at both sides of the protective shield and respectively joined to both ends of the protective shield, wherein:

the two side plates of the guiding structures are respectively joined to both sides of the insulative body, and each of the two side plates is spaced from the insulative body by a second receptacle; and each of two top plates is spaced from the insulative body by a third receptacle, and the two third receptacles are in communication with the first receptacle, and the two third receptacles are respectively in communication with the two second receptacles.

5. The plug connector as recited in claim 4, wherein the first receptacle is a through receptacle.

6. The plug connector as recited in claim 4, wherein the protective shield further includes a cutout or a window for exposing one or more engaging portions of the pressing piece.

7. The plug connector as recited in claim 4, wherein the protective shield is higher than the two top plates of the two guiding structures so that a height difference is defined between the protective shield and each of the top plates.

8. The plug connector as recited in claim 1, wherein the protective shield has at least two supporting portions disposed at both sides of the elastic fastener and joined to the insulative body.

9. The plug connector as recited in any of claim 8, wherein the protective shield has at least one portion overlapped with the at least one plug board in the vertical direction.

10. The plug connector as recited in any of claim 8, wherein the elastic fastener further includes a fixed plate mounted on the insulative body, the pressing piece has a fixed end joined to the fixed plate, and the pressing piece is folded backward from the fixed plate, inclined upward and extending backward.

11. A plug connector, comprising:

an insulative body;

at least one plug board, protruding forward from the insulative body and having a plurality of conductive pads spaced next to each other;

a pressing piece having a fixed end mounted on the insulative body, and a free end spaced a distance from the fixed end in a horizontal direction and also spaced a distance from the insulative body in a vertical direction; and a protective shield, joined to the insulative body, and located at a frond side of the pressing piece, wherein the protective shield has a height greater than that of the fixed end of the pressing piece and at least one portion of the pressing piece is disposed between the insulative body and the protective shield.

12. The plug connector as recited in claim 11, wherein the insulative body further includes a protrusion located in between the at least one plug board and the protective shield.

13. The plug connector as recited in claim 12, wherein the fixed end of the pressing piece is mounted on the protrusion of the insulative body.

14. The plug connector as recited in claim 11, wherein the protective shield includes a main plate located outside an upper side of the insulative body, and two protective side plate joined with the main plate and respectively located outside both sides of the insulative body.

15. The plug connector as recited in claim 14, wherein the insulative body further includes two locking members respectively joined in between the two protective side plates of the protective shield and the insulative body.

16. The plug connector as recited in claim 14, wherein the main plate of the protective shield is spaced from the insulative body by a first receptacle, and each of the two protective side plates of the protective shield is spaced from the insulative body by a second receptacle, and the first receptacle and the two second receptacles are in communication with one another.

17. The plug connector as recited in claim 11, wherein the protective shield further includes a cutout or a window so as to expose one or more engaging portions of the pressing piece.

18. The plug connector as recited in claim 11, wherein the protective shield spans over the pressing piece, and is overlapped with at least one portion of the pressing piece in the vertical direction.

19. The plug connector as recited in claim 11, wherein the protective shield is spaced a distance from the pressing piece and has no contact with the pressing piece.

20. The plug connector as recited in claim 11, wherein the protective shield has at least two supporting portion respectively located at both sides of the pressing piece and joined to the insulative body.

* * * * *